US009816374B2

(12) United States Patent
Sobolewski et al.

(10) Patent No.: US 9,816,374 B2
(45) Date of Patent: Nov. 14, 2017

(54) HIGH DATA-RATE TELEMETRY PULSE DETECTION WITH A SAGNAC INTERFEROMETER

(71) Applicant: Halliburton Energy Services, Inc., Houston, TX (US)

(72) Inventors: Zbigniew Stanislaw Sobolewski, Houston, TX (US); Douglas Mark Knight, Porter, TX (US); John Laureto Maida, Houston, TX (US); Neal Gregory Skinner, Lewisville, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 187 days.

(21) Appl. No.: 14/440,416

(22) PCT Filed: Apr. 30, 2014

(86) PCT No.: PCT/US2014/036146
§ 371 (c)(1),
(2) Date: May 4, 2015

(87) PCT Pub. No.: WO2014/179452
PCT Pub. Date: Nov. 6, 2014

(65) Prior Publication Data
US 2016/0040530 A1 Feb. 11, 2016

Related U.S. Application Data

(60) Provisional application No. 61/818,683, filed on May 2, 2013.

(51) Int. Cl.
*G01B 9/02* (2006.01)
*E21B 47/18* (2012.01)
(Continued)

(52) U.S. Cl.
CPC ............ *E21B 47/18* (2013.01); *E21B 47/123* (2013.01); *G01V 1/226* (2013.01); *G01V 11/002* (2013.01)

(58) Field of Classification Search
CPC ............ G02B 6/29347; G01D 5/35322; E21B 47/18; E21B 47/123; G01V 1/226; G01V 11/002; G01H 9/004
See application file for complete search history.

(56) References Cited

U.S. PATENT DOCUMENTS 4,375,680 A 3/1983 Cahill et al.
6,529,444 B2 3/2003 Vakoc
(Continued)

FOREIGN PATENT DOCUMENTS

CN 1075202 A 8/1993
GB 2403292 A 12/2004
(Continued)

OTHER PUBLICATIONS

Extended European Search Report issued in related European Application No. 14791348.7, dated Oct. 27, 2016.
(Continued)

*Primary Examiner* — Michael A Lyons
(74) *Attorney, Agent, or Firm* — John W. Wustenberg; Baker Botts L.L.P.

(57) ABSTRACT

An example telemetry signal detection apparatus may include a optical splitter, a light source optically coupled to the optical splitter, and a light detector optically coupled to the optical splitter. The apparatus further may include a reference loop optically coupled to the optical splitter and a sensor loop optically coupled to the reference loop and the optical splitter. The reference loop may be contained within a reference loop enclosure. The sensor loop and reference
(Continued)

loop may comprise a zero-area Sagnac loop with folded optical fiber or dual fiber cable configurations.

17 Claims, 5 Drawing Sheets

(51) Int. Cl.
  *G01V 1/22* (2006.01)
  *E21B 47/12* (2012.01)
  *G01V 11/00* (2006.01)

(56) References Cited

U.S. PATENT DOCUMENTS

| | | |
|---|---|---|
| 9,091,155 B2 * | 7/2015 | Barfoot ............... E21B 47/123 |
| 2002/0063866 A1 * | 5/2002 | Kersey ............... E21B 47/102 |
| | | 356/478 |
| 2002/0097636 A1 | 7/2002 | Vakoc |
| 2010/0098114 A1 | 4/2010 | Defreitas et al. |
| 2010/0281985 A1 | 11/2010 | Kumagai et al. |
| 2012/0126992 A1 | 5/2012 | Rodney et al. |
| 2013/0034351 A1 | 2/2013 | Goldner et al. |
| 2013/0056197 A1 * | 3/2013 | Maida ............... E21B 47/123 |
| | | 166/250.01 |
| 2014/0175271 A1 * | 6/2014 | Samson ............... E21B 47/123 |
| | | 250/264 |

FOREIGN PATENT DOCUMENTS

| | | |
|---|---|---|
| JP | 2007-205940 A | 8/2007 |
| RU | 2008144790 A | 5/2010 |
| WO | 2012-023918 A1 | 2/2012 |

OTHER PUBLICATIONS

Eberle et al., "Quantum Enhancement of the Zero-Area Sagnac Interferometer Topology for Gravitational Wave Detection", Phys. Rev. Lett. 104, 251102 (2010).

S. Shahriar and M. Salit, "A Zero-Area Sagnac Ring Laser Gravitational Wave Detector with Fast-Light Enhanced Strain Sensitivity," in Frontiers in Optics 2008/Laser Science XXIV/Plasmonics and Metamaterials/Optical Fabrication and Testing, OSA Technical Digest (CD) (Optical Society of America, 2008), paper LTuB3.

International Search Report and Written Opinion issued in related PCT Application No. PCT/US2014/036146 dated Sep. 11, 2014, 16 pages.

Office Action issued in related Russian Application No. 2015141479, dated Dec. 16, 2016 (9 pages).

Office Action issued in related Chinese Application No. 201480017603.0, dated Jul. 24, 2017 (7 pages).

* cited by examiner

HIGH DATA-RATE TELEMETRY PULSE DETECTION WITH A SAGNAC INTERFEROMETER

CROSS-REFERENCE TO RELATED APPLICATION

The present application claims priority to United Stated Provisional Application No. 61/818,683, entitled "Improved Sagnac Pulse Detection System" and filed May 2, 2013, and is a U.S. National Stage Application of International Application No. PCT/US2014/036146 filed Apr. 30, 2014, both of which are herein incorporated by reference in their entirety for all purposes.

BACKGROUND

Subterranean drilling systems may use telemetry systems to transmit telemetry data from subterranean tools to information handling systems positioned at the surface. These telemetry systems may comprise mud pulse telemetry systems that generate pressure pulses in a flow of drilling fluid. The pressure pulses may be detected at the surface. In certain instances, the telemetry systems may need to transmit with a high data rate, which may require high bit-rate transmission from the telemetry system and high efficiency pulse detection at the surface. One example pulse detection mechanism is a Sagnac interferometer, which may provide information regarding disturbances or vibrations within a fiber optic loop by generating a light signal with a predetermined wavelength, transmitting the light signal through an optical fiber loop, and detecting the resulting coherent light phase shift. Typical Sagnac interferometers are sensitive to environmental noise and vibration, however, which may reduce their ability to detect high bit-rate pressure pulses.

FIGURES

Some specific exemplary embodiments of the disclosure may be understood by referring, in part, to the following description and the accompanying drawings.

Figure 1:
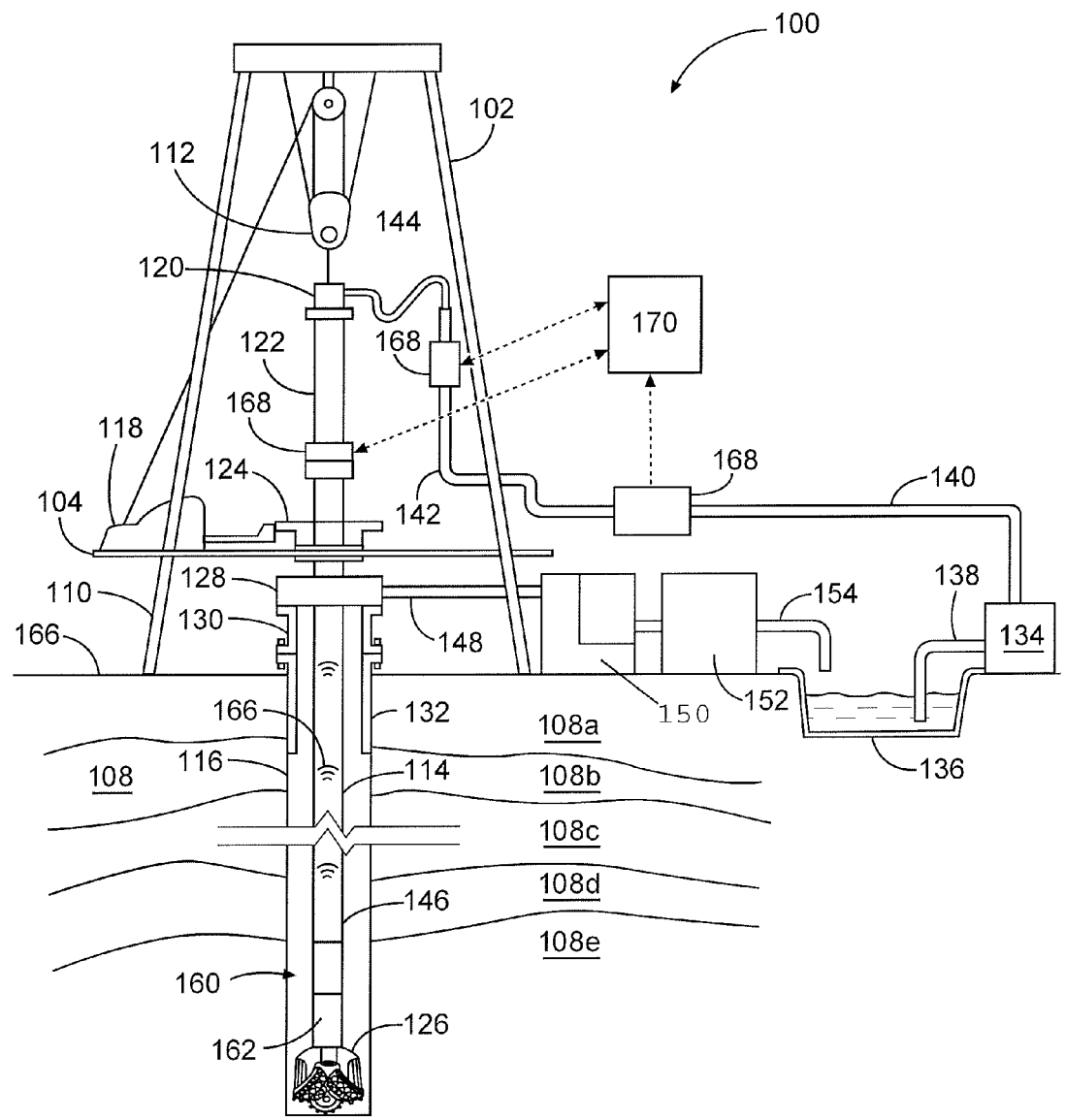
FIG. 1 is a diagram illustrating an example drilling system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates to the use of a Sagnac interferometer for detection of small length or dielectric constant variations of a sensing loop in the presence of dynamic instabilities induced during well drilling operations and, more particularly, to high data-rate telemetry pulse detection using a Sagnac interferometer.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Any one of the computer readable media mentioned above may stored a set of instruction that, when executed by a processor communicably coupled to the media, cause the processor to perform certain steps of actions.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to drilling operations that include, but are not limited to, target (such as an adjacent well) following, target intersecting, target locating, well twinning such as in SAGD (steam assist gravity drainage) well structures, drilling relief wells for blowout wells, river crossings, construction tunneling, as well as horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, stimulation wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

Modern petroleum drilling and production operations demand information relating to downhole parameters and conditions. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing downtime. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Thus, if a first device communicatively couples to a second device, that connection may be through a direct connection, or through an indirect communication connection via other devices and connections. The indefinite articles "a" or "an," as used herein, are defined herein to mean one or more than one of the elements that it introduces. The term "uphole" as used herein means along the drillstring or the hole from the distal end towards the surface, and "downhole" as used herein means along the drillstring or the hole from the surface towards the distal end.

FIG. 1 is a diagram illustrating an example drilling system 100, according to aspects of the present disclosure. In the embodiment shown, the system 100 comprises a derrick 102 mounted on a floor 104 that is in contact with the surface 106 of a formation 108 through supports 110. The formation 108 may be comprised of a plurality of rock strata 108a-e, each of which may be made of different rock types with different characteristics. At least some of the strata may be porous and contain trapped liquids and gasses 108a-e. Although the system 100 comprises an "on-shore" drilling system in which floor 104 is at or near the surface, similar "off-shore" drilling systems are also possible and may be characterized by the floor 104 being separated from the surface 106 by a volume of water.

The derrick 102 may comprise a traveling block 112 for raising or lowering a drill string 114 disposed within a borehole 116 in the formation 108. A motor 118 may control the position of the traveling block 112 and, therefore, the drill string 114. A swivel 120 may be connected between the traveling block 112 and a kelly 122, which supports the drill string 114 as it is lowered through a rotary table 124. A drill bit 126 may be coupled to the drill string 114 via a bottom hole assembly (BHA) 160 and driven by a downhole motor (not shown) and/or rotation of the drill string 114 by the rotary table 124. As bit 126 rotates, it creates the borehole 116, which passes through one or more rock strata or layers of the formation 108.

The drill string 114 may extend downwardly through a bell nipple 128, blow-out preventer (BOP) 130, and wellhead 132 into the borehole 116. The wellhead 132 may include a portion that extends into the borehole 116. In certain embodiments, the wellhead 132 may be secured within the borehole 116 using cement. The BOP 130 may be coupled to the wellhead 132 and the bell nipple 128, and may work with the bell nipple 128 to prevent excess pressures from the formation 108 and borehole 116 from being released at the surface 106. For example, the BOP 130 may comprise a ram-type BOP that closes the annulus between the drill string 114 and the borehole 116 in case of a blowout.

During drilling operations, drilling fluid, such as drilling mud, may be pumped into and received from the borehole 116. Specifically, the drilling system may include a mud pump 134 that may pump drilling fluid from a reservoir 136 through a suction line 138 into the drill string 114 at the swivel 120 through one or more fluid conduits, including flow pipe 140, stand-pipe 142, and kelly hose 144. As used herein, a fluid conduit may comprise any pipe, hose, or general fluid channel through which drilling fluid can flow. Once introduced at the swivel 120, the drilling mud then may flow downhole through the drill string 114 and BHA 160, exiting at the drill bit 126 and returning up through an annulus 146 between the drill string 114 and the borehole 116 in an open-hole embodiments, or between the drill string 114 and a casing (not shown) in a cased borehole embodiment. While in the borehole 116, the drilling mud may capture fluids and gasses from the formation 108 as well as particulates or cuttings that are generated by the drill bit 126 engaging with the formation 108. The drilling fluid then may flow to fluid treatment mechanisms 150 and 152 through a return line 148 after exiting the annulus 146 via the bell nipple 128.

The BHA 160 comprises a LWD/MWD tool 162 with one or more sensors that may capture measurements corresponding to the formation 108 and/or the drilling system 100. The BHA 160 further comprises a telemetry system 164 coupled to the LWD/MWD tool 162. In certain embodiments, the telemetry system 164 may receive measurements from the LWD/MWD tool 162 and transmit telemetry data corresponding to the received measurements to the surface 106. In the embodiment shown, the telemetry system 164 may comprise a mud pulser with a controller that receives measurements from the LWD/MWD tool 162 and transmits telemetry data corresponding to the measurement data to the surface 106 in the form of pressure signals 166 within the circulating drilling fluid. The pressure signals 166 may comprise pressure pulses that travel upwards within the drill string 114 and towards the pump 134 through the kelly 122, kelly hose 144, stand pipe 142, and pipe 140.

The pressure signals 166 may be received at one or more pulse detectors 168. In the embodiment shown, the pulse detectors 168 are shown coupled to fluid conduits of the system 100—kelly 122, stand pipe 142, and flow pipe 140—although the pulse detectors 168 may be positioned anywhere within the drilling system where they will be exposed to the pressure pulses 166. The pulse detectors 168 may be communicably coupled to an information handling system 170 positioned at the surface, such as through a wired or wireless communications channel. The information handling system 170 may receive output signals from the pulse detectors 168 that correspond to the pressure pulses 166 and extrapolate the measurement data from the LWD/MWD tool 162 based, at least in part, on the output signals. Although three detectors 168 are shown, drilling systems according to aspects of the present disclosure may comprise one or more pulse detectors.

According to aspects of the present disclosure, at least one of the pulse detectors 168 may comprise a loop of an optical component, such as an optical fiber, wrapped around a fluid conduit containing the pressure signals 166. In certain embodiments, the optical component loop may comprise a Sagnac Loop and may be used as part of a Sagnac Loop interferometer to sense the pressure pulses within the fluid conduit by routing light in opposite directions along an asymmetrical optical component loop comprise of a pressure pulse sensing section and a light signal delay section with accompanying connecting leads. The light may be recombined at a detector where an interference pattern created can be detected, and measuring the integration of disturbance along the entire loop. The resulting measurements may provide information regarding physical disturbances or vibrations located within the loop of the Sagnac interferometer that correspond to the pressure signals 166.

Figure 2:
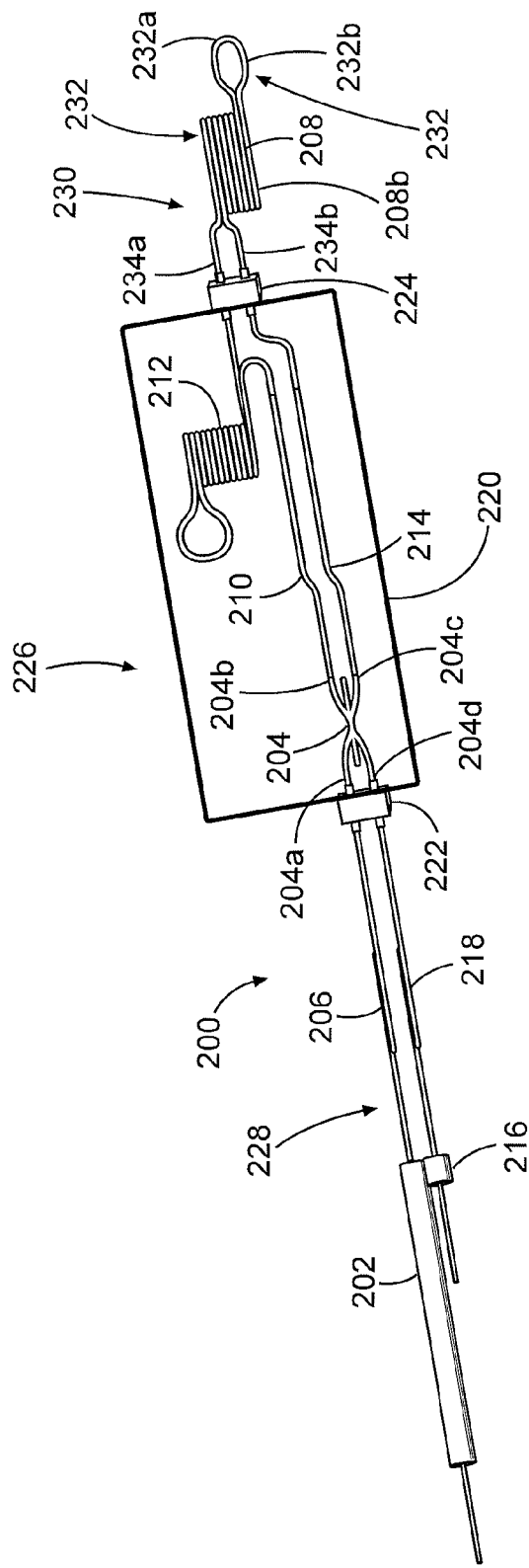
FIG. 2 is a diagram illustrating an example optical architecture of a Sagnac Loop Interferometer, according to aspects of the present disclosure.

FIG. 2 is a diagram illustrating an example Sagnac Loop interferometer 200 that may be incorporated into a pulse detection system similar to those described above, according to aspects of the present disclosure. The interferometer 200 may comprise a light source 202 optically coupled to an optical splitter 204 though an optical pathway 206. As used herein, an optical pathway may comprise optical fibers or other media that are capable of transmitting light from one end to another. The optical splitter 204 may comprise a fiber coupler. The term optically coupled and its variations may refer to a coupling in which light can be transmitter between the two elements that are optically coupled. The light source 202 may be a laser, light emitting diode (LED), or any other light source suited for sending light through an optical pathway. In the embodiment shown, the optical splitter 204 comprises four leads 204a-d, and the light source 202 is coupled to the optical splitter 204 at lead 204a. Leads 204b and 204c may be optically coupled through an asymmetric optical component loop comprising optical pathway 210, reference loop 212, sensor loop 208 and optical pathway 214. Specifically, lead 204b may be optically coupled to reference loop 212 through optical pathway 210, reference loop 212 may be optically coupled to sensor loop 208, and sensor loop 208 may be optically coupled to lead 204c through optical pathway 214, forming a closed Sagnac Loop between leads 204b and 204c. The sensor loop 208 constitutes a sensor section of the Sagnac loop described above, and may comprise a coil or loop of optical fiber similar to the optical fiber of the optical pathways. The reference loop 212 may have a similar construction and constitute a light signal delay section that acts as a delay-forming asymmetricity within the Sagnac Loop. The interferometer 200 may further comprise a light detector 216 coupled to the splitter 204 at lead 204d through an optical pathway 218.

In use, the light source 202 may generate a light wave or beam that is split into two or more waves at the splitter 204, one portion exiting through lead 204b and one other portion exiting simultaneously though lead 204c. The light wave exiting through lead 204b may be received at lead 204c, thereby traveling in a generally clockwise direction with respect to FIG. 2. The light wave exiting through lead 204c may be received at lead 204b, thereby traveling in a generally counter-clockwise direction with respect to FIG. 2. In the following description the light wave traveling in the generally clockwise direction will be referred to as the clockwise wave, and the light traveling in the generally counter-clockwise direction may be referred to as the counter-clockwise wave. These directions are not limiting, refer only to the orientation shown in FIG. 2, and do not specifically refer to the directions the light may travel through individual optical elements, such as sensor loop 208 and reference loop 212.

As described above, the sensor loop 208 may be wrapped around a fluid conduit within a drilling system to sense pressure pulses corresponding to a telemetry data. When pressure pulses or other disturbances are not present within the sensor loop 208, the clockwise and counter-clockwise light waves may travel from lead 204b to lead 204c and from lead 204c to lead 204b, respectively, in essentially the same time and with essentially the same form. When received at the splitter 204, the clockwise and counter-clockwise light wave may be in phase when recombined and the recombined light may have characteristics such as phase, color, intensity etc. similar to the characteristics of the light wave transmitted by the light source 202 or to a set of expected characteristics accounting for the principle of operation and physical limitations of the interferometer. When pressure pulses or other disturbances are present within the sensor loop 208, it may impart temporary physical changes within sensor loop 208 by stretching the optical fiber of the loop 208 or changing the optical fiber density of the loop 208 by affecting the dielectric constant/refractive index of fiber. The physical changes may alter the light time travel of the counter-clockwise wave through the sensor loop 208, thereby altering the phase of the counter-clockwise wave with respect to the clockwise wave. Any distortion in the counter-clockwise wave as it travels through the sensor loop 208 will be interposed on the clockwise wave, which travels through the sensor loop 208 after the counter-clockwise wave due to the delay caused by reference loop 212. The distorted clockwise and counter-clockwise waves may arrive at the optical splitter 204 at different times, creating a light intensity change based on the momentary phase differences of the clockwise and counter-clockwise waves. The pressure pulses or other environmental variation affecting propagating waves through the sensor loop 208 can be inferred from these waves and the resulting light intensity fluctuations. In certain embodiments, the optical pathways 210 and 214 may comprise depolarizers, such as Lyot depolarizers, to scramble the polarization of the clockwise and counter-clockwise waves and ensure that the constructive or destructive interference between the distorted waves is not skewed or faded by distorted light polarization in the clockwise and counter-clockwise waves.

The light detector 216 may receive the recombined light and generate an output signal corresponding to the recombined light. In certain embodiments, an information handling system (not shown) communicably coupled to the light detector 216 may, based on a set of executable instructions stored within the information handling system, receive the output signal from the light detector 216, determine a characteristics of the recombined light (e.g., intensity) from the output signal, and compare the determined characteristic of the recombined light to a corresponding characteristic of the transmitted light or to a corresponding expected characteristics of the recombined light that accounts for the physical limitations of the interferometer 200, as described above. If the determined characteristic of the recombined light differs from the corresponding characteristic of the transmitted light or the corresponding expected characteristics of the recombined light, it may indicate that a disturbance such as a pressure pulse was present within the sensor loop 208.

The reference loop 212 may function as a delay for the counter-clockwise wave's sensor loop 208 born distortion, so that the clockwise and counter-clockwise waves may arrive at the splitter at different times, and therefore with different phases, resulting in a fluctuation in the intensity of the recombined light. The reference loop 208, however, may be sensitive to environmental noise, vibrations, and other disturbances like the sensor loop 208, and such disturbances at the reference loop 212 may delay or otherwise alter the clockwise and/or counter-clockwise waves, similar to how the waves are delayed or affected within the sensor loop 208. Accordingly, these disturbances within the reference loop 212 may alter the characteristics of the recombined light similar to disturbances within the sensor loop 208, adding an uncertainty and noise that reduces the effectiveness of the interferometer 200 in detecting disturbances occurring in the area covered by sensor loop 208. As will be described below, to improve performance, the reference loop 212 may comprise a bi-folded loop, which minimizes the amount of phase change the reference loop 212 can generate.

According to aspects of the present disclosure, the performance may be further improved if the reference loop 212 is positioned within a reference loop enclosure 220, which may protect the reference loop 212 from environmental noise and vibrations that generate phase changes not related to changes within the sensor loop 208. The enclosure 220 may comprise a sealed, air-tight and/or water-tight enclosure that protects the reference loop 212 from the environment. The enclosure 220 may be made of metal or plastic, and in certain embodiments an elastomeric or other soft covering may be used to decrease external vibration from entering the system and causing changes in the reference coil 212. Additionally, the enclosure 220 may be filled with an elastomeric or wax material to damp external vibrations from impacting the reference coil 212. In the embodiment shown, the enclosure comprises optical connectors 222 and 224 through which the optical elements within the reference loop enclosure 220 may be optically coupled to external optical elements without opening or otherwise affecting the contents of the enclosure 220. The optical connectors 222 and 224 may be built into the enclosure to ensure that a proper seal is formed around the connectors 222 and 224. Although connectors 222 and 224 are shown as dual connectors, two single connectors can be installed where each of the dual connector 222 and 224 are shown.

In the embodiment shown, the optical elements within the enclosure 220, including optical splitter 204, optical pathways 210 and 214 and reference loop 212, may constitute a reference module 226 of the interferometer 200. Optical connector 222 may be used to optically couple the reference module 226 to an input/output module 228 of the interferometer 200, comprised of the light source 202, light detector 216, and optical pathways 216 and 218. In contrast, optical connector 224 may be used to optically couple reference module 226 to the sensor module 230, comprising sensor loop 208. Notably, the position of the elements with respect to the enclosure 220 may be altered. For example, the light source 202 and receiver 216 may be inside the enclosure 220 along with the other components, or they may be remote from the enclosure, as shown. In certain embodiments, the light source 202 and receiver 216 may be housed a large distance from the remaining system in a controlled environment, allowing the sensor loop 208 and reference loop 212 to be used in a hazardous (explosive) atmosphere without concern about the electrical components becoming an ignition source.

According to aspects of the present disclosure, the sensor loop 208 may comprise portions that are effectively wrapped in opposite directions with respect to light traveling through the loop 208. The portions may comprise ends of a single optical fiber or two optical fibers that are spliced or otherwise joined together. In the embodiment shown, the sensor loop 208 comprises a sinlge folded optical fiber 234 with a first end 234a and a second end 234b. In the embodiment shown, the fiber 234 is folded in half ("bi-folded") with a mid-point 232a of the fiber located in a loop relief segment 232 of the fiber 234. The loop relief segment 232 may allow for the optical fiber 234 to be folded without breaking, creasing, excessive bending or otherwise altering the optical channel. In certain embodiments, a restrain plate 232b may be positioned within the loop relief 232 to maintain the radius and position of the loop relief 232 with respect to the length of the fiber 234. The restrain plate 232b may be made of a soft and flexible material, for example, that allows for some movement of the optical fiber. Although the restrain plate 232b is shown in a tear-drop shape, other shapes are possible.

After the fiber is folded, the two ends of the fiber may be held in a length-wise, adjacent alignment and wrapped in an open contour loop around a fluid conduit. Notably, a light wave traveling through the bi-folded fiber 234 may travel in a first rotational direction through the loop before passing the mid-point 232 a and in a second, opposite rotational direction through the loop after passing the mid-point 232 a. Thus, the fiber 234 includes portions that are effectively wrapped in opposite directions with respect to the light traveling through the fiber 234. The length of fiber traveled in both directions may be substantially the same based on the location of the mid-point 232 a within the loop relief 232. Notably, the effectively opposite windings in the bi-folded arrangement may reduce the sensitivity of the sensor loop 208 to rotation of the fluid conduit, allowing for pressure pulses or other disturbances within the sensor loop 208 to be accurately sensed. In certain embodiments, the portions of the sensor loop 208 that are effectively wrapped in opposite directions may comprise two separate fibers held in a length-wise parallel arrangement, spliced or joined together at one end, and wound around a fluid conduit, such that the two fibers are functionally the same as the ends of a bi-folded wire. In certain embodiments, the two fibers may consist of first and second optical fibers within a single jacket. In other embodiments, the two equal-length fibers may comprise two filaments within a bi-filament fiber. Light may be routed between the respective ends of the first and second optical fibers using, for example, individual connectors coupled to each of the fibers, an integrated dual aperture optical connector coupled to both of the fibers, a short optical loop relief similar to loop relief 232 described above, a tapered, fiber turn such as MiniBend™ from AFL, and a reflector cube coupled to both fibers, which is shown in FIG. 5B, discussed below. When two fibers or filaments are used, light may travel in a first rotational direction through the loop on the first fiber or filament, and in a second, opposite rotational direction through the loop on the second fiber or filament. The two fiber configuration may be functionally the same as the bi-folded configuration and provide similar advantages with respect to rotational insensitivity.

In certain embodiments, the reference loop 212 may also comprise portions that are effectively wrapped in opposite directions with respect to light traveling through the loop 212. For example, the reference loop 212 may comprise a single bi-folded optical fiber or two fibers or filaments held in a length-wise parallel arrangement and spliced or joined together at one end. Unlike the sensor loop 208, which is would around a fluid conduit, however, the fiber or fibers of the reference loop 212 may be wound around a reference loop core (not shown). When used with the reference loop 212, these configurations may reduce the sensitivity of the reference loop 212 to rotational movement, thereby reducing signal noise added by the reference loop 212, particularly when used with the enclosure 220 to protect the reference loop 212 from other environmental disturbances. As used herein, the term loop may refer to coils similar to that illustrated in FIG. 2, or other arrangements such as nests or balls that provide the delay functionality of a coil while still reducing the rotational sensitivity of the interferometer.

When the effectively opposite windings are used for the sensor loop 208 and reference loop 212, the elements optically coupling the lead 204b to the lead 204c, including optical pathway 210, reference loop 212, sensor loop 208 and optical pathway 214, may be collectively referred to as a zero-area Sagnac Loop. Generally, the zero-area Sagnac Loop concept can be characterized as a surface created by a perimeter of an optical fiber loop, with the effectively opposite windings creating closed loop contours that result in a surface area as close to zero as the diameter of the fiber allows. The zero-area Sagnac Loop configuration may substantially eliminate the sensitivity of the interferometer and each of the constituent elements of the Sagnac Loop to rotation.

In certain embodiments, the sensitivity of the interferometer 200 to pressure pulses and disturbances may be leveraged to detect high-data rate telemetry signals used in a drilling system. For example the sensor loop 208 may arranged around a fluid conduit that is in fluid communication with a telemetry system disposed within a borehole in a subterranean formation, as is described above. Arranging the sensor loop 208 around the fluid conduit may comprise wrapping a optical fiber around the conduit. A light wave may be transmitted from the light source 202 and split into clockwise and counter-clockwise waves that travel to the sensor loop 208 through the reference loop enclosure 200, including at least reference loop 212. The clockwise and counter-clockwise waves, after traveling through the sensor loop 208, may be recombined at the optical splitter 204, and the recombined wave received at the light detector 216. A determination about whether a pressure pulse has traveled through the fluid conduit can be made by analyzing the received light wave. The analysis may be performed at described above, including determining a characteristics of the received light and comparing the determined characteristics to a characteristic corresponding to the transmitted light wave. Although the above method has been described above with respect to a fluid conduit in a drilling system, the zero-are Sagnac loop interferometer 200 may be used to detect pulses in many different types of fluid conduits or disturbances in other types of elements about which the sensor loop 208 can be wrapped. Additionally, the pressure pulses may be received and the light intensity characterized over time to extrapolate data from the telemetry signals. For example, the pressure pulses transmitted from the downhole telemetry system may comprise pressure pulses modulated in terms of phase, amplitude, frequency, etc., all of which may affect the characteristics (e.g., intensity) of the recombined light received at the light detector in the interferometer. Output signals corresponding to the intensity values may be transmitted to an information handling system, as described above, that may resolve the modulated pressure pulses to extrapolate the transmitted telemetry data.

Figure 3:
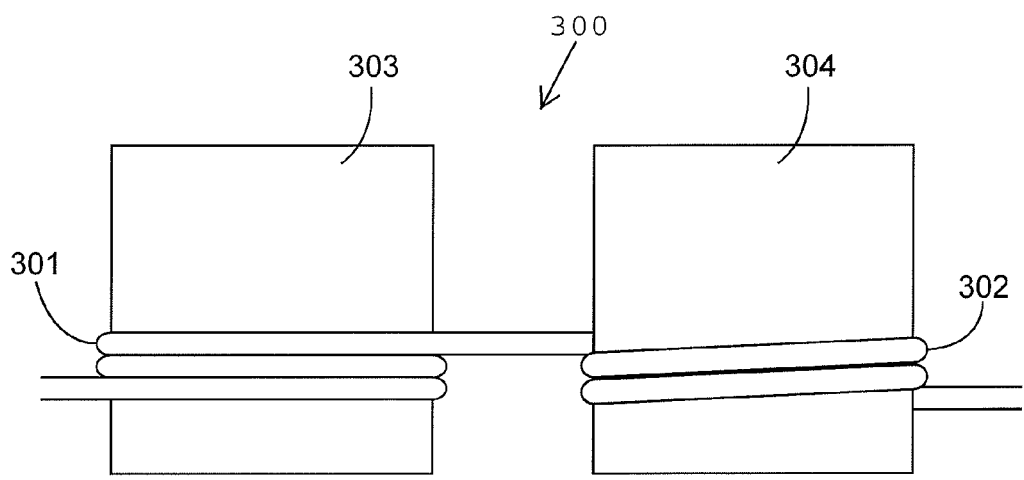
FIG. 3 is a diagram of an example reference loop, according to aspects of the present disclosure.

In addition to the bi-folded and two fiber configurations described above, the portions of the reference loop 212 that are effectively wrapped in opposite directions may comprise two separate loops. FIG. 3 illustrates an example reference loop 300 comprising a first loop 301 and a second loop 302. In the embodiment shown, the first loop 301 and the second loop 302 are wrapped in the opposite directions around respective core 303 and 304 arranged in parallel. The loops 301,302 may be formed from a single fiber or from two separate fibers spliced at a midpoint between the cores 303,304. The loops 301,302 may have equal diameters and lengths of fiber, such that the travel time through each is effectively the same. In certain embodiments, the loops 301,302 may be wrapped around a single core, or the cores 303,304 may be joined together.

In the embodiment shown, light traveling through the first loop 301 may travel in a first direction around the core 303, and light traveling through the second loop 302 may travel in a second, opposite direction around the core 304. Thus the loops 301,302 comprise portions of the reference loop 300 that are effectively wound in opposite directions. In other embodiments, the loops 301,302 be wrapped in the same direction around respective cores 303,304, or around a single core, yet effectively wrapped in opposite directions by changing how the ends of the fibers are connected. Splitting the reference loop into first loop and second loop may be less expensive than the single bi-folded reference loop for this reason, with substantially similar performance and external vibration reduction.

Figure 4:
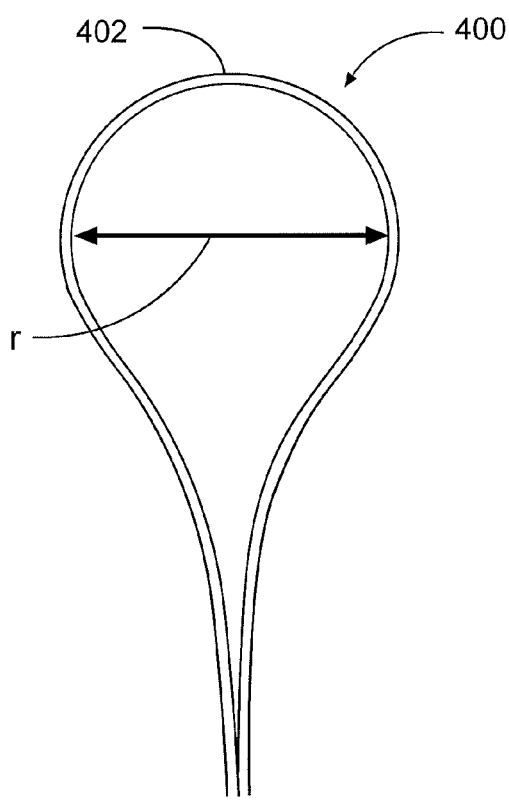
FIG. 4 shows an example prototype of an optical fiber folding loop relief, according to aspects of the present disclosure.

FIG. 4 is a diagram illustrating an example loop relief 400, according to aspects of the present disclosure. In the embodiment shown, the loop relief 400 comprises a circular shape within a single optical fiber in which a midpoint 402 of the fiber is positioned equidistant from the ends of the loop relief 400. The radius r of the loop may be based, in part, on the bend resistance of the optical fiber, and the amount it can be folded without sustaining bend and tensile stress-induced glass fracture damage or increased macrobend and microbend optical loss. A similar loop relief 400 may be applied to the two fibers in a two fiber configuration, or the two fibers may be simply spliced together with or without a loop relief. Likewise, a restrain plate (not shown) may be included within the loop relief, to maintain the shape of the relief 400 and its orientation with respect to the optical fiber.

Figure 5A:
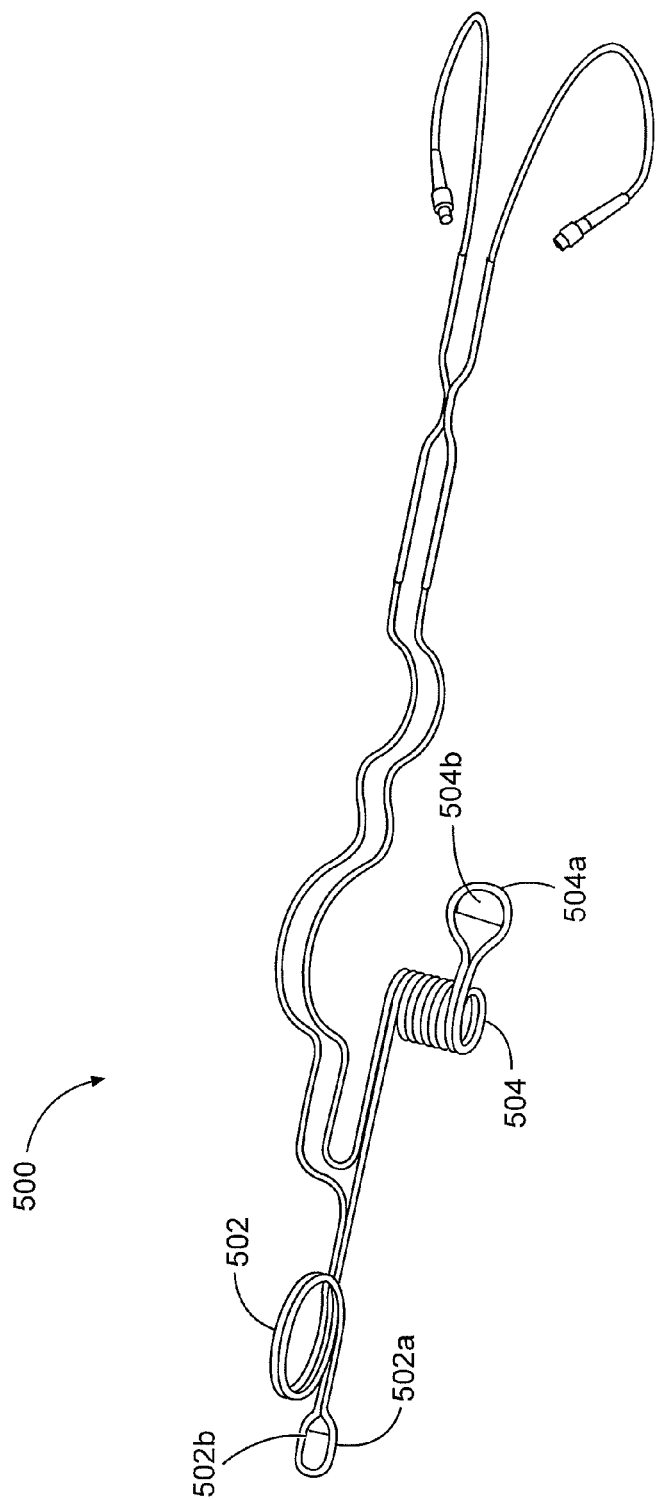
FIG. 5A illustrates an example of a Sagnac Loop Interferometer, according to aspects of the present disclosure.
Figure 5B:
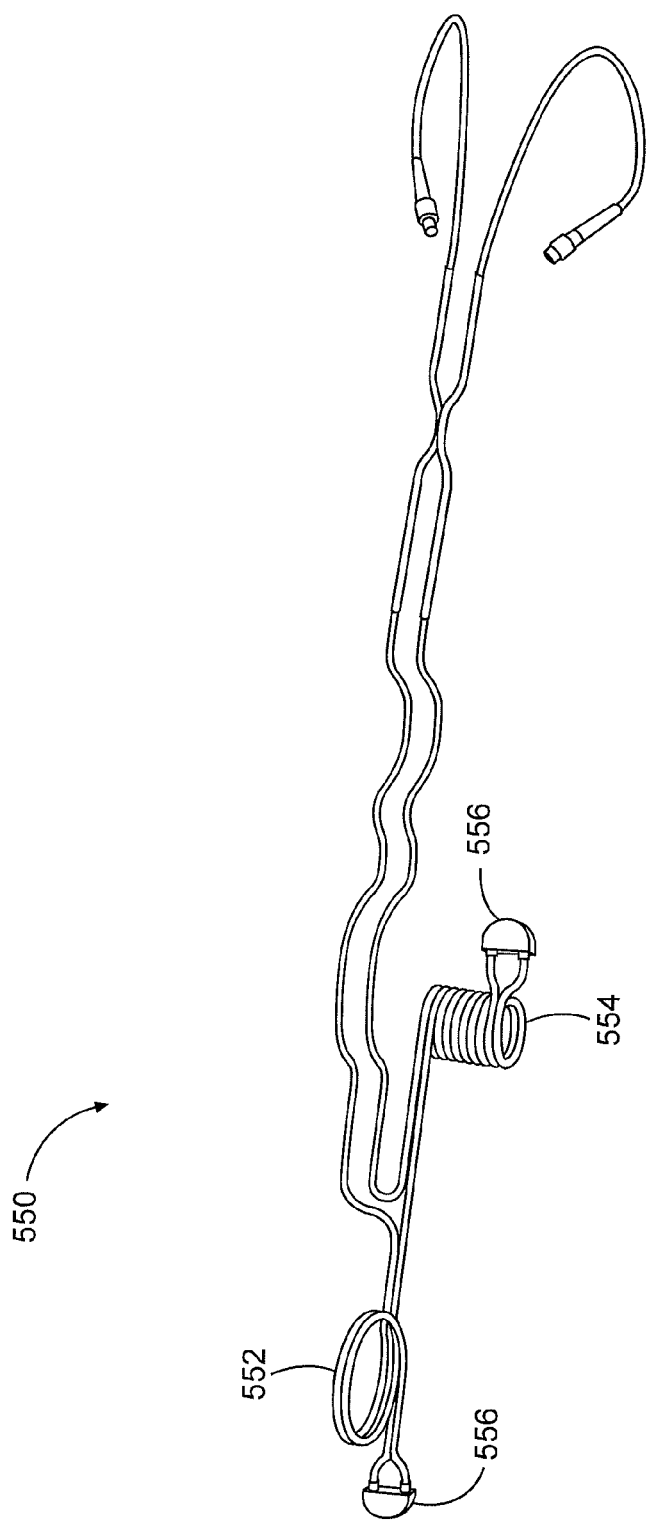
FIG. 5B illustrates an example of a Sagnac Loop Interferometer, according to aspects of the present disclosure.

FIGS. 5A and 5B are diagrams illustrating example zero-area loop interferometers with different types of loop reliefs and terminations, according to aspects of the present disclosure. FIG. 5A, for example, illustrates an interferometer 500 with a zero-area, bi-fold sensor loop 502 and bi-fold reference loop 502. The sensor loop 502 comprises a tear-drop shaped loop relief 502a with a restrain plate 502b. Similarly, the reference loop 504 comprises a circle shaped loop relief 504a with a restrain plate 504b. In contrast, FIG.

5b illustrates an interferometer 550 with a zero-area, two fiber loop 552 and two fiber loop 554. Both the fibers of both the sensor loop 552 and the reference loop 554 are terminated at reflector cubes 556, that optically coupled the strands of the dual fiber cables. Notably, the reference loop enclosure is not shown in either FIG. 5A or 5B for ease of explanation, but it should be appreciated that an enclosure can be incorporated with respect to both, as outlined above with respect to FIG. 2.

According to aspects of the present disclosure, an example apparatus comprises an optical splitter, a light source optically coupled to the optical splitter, a light detector optically coupled to the optical splitter. The apparatus may further include a reference loop optically coupled to the optical splitter, and a sensor loop optically coupled to the reference loop and the optical splitter. The reference loop may be contained within a reference loop enclosure. In certain embodiments, the apparatus may include a Lyot Depolariser optically coupled between the sensor loop and the optical splitter. In certain embodiments, the reference loop enclosure may comprise a plurality of optical connectors; the light source and light detector may be optically coupled to the optical splitter through at least one of the plurality of optical connectors; and the sensor loop may be optically coupled to the reference loop and the optical splitter through at least one other of the plurality of optical connectors.

In certain embodiments, at least one of the sensor loop and the reference loop may comprise portions that are effectively wrapped in opposite directions with respect to light traveling through the loop. The at least one of the sensor loop and the reference loop may comprise a folded optical fiber with a midpoint located in a loop relief segment. In certain embodiments, that apparatus may comprise a restrain plate positioned within the loop relief segment. In certain embodiments, at least one of the sensor loop and the reference loop comprises two fibers wound in a length-wise parallel arrangement and optically coupled together. The two fibers may be optically coupled using at least one of a loop relief segment, a reflector cube, a tapered, fiber turn, and a splice.

In certain embodiments, the reference loop comprises a first optical fiber loop effectively wound in a first direction and a second optical fiber loop effectively wound in a second direction. The first optical fiber loop and the second optical fiber loop may be arranged in parallel on reference loop core.

According to aspects of the present disclosure, an example method for telemetry pulse detection comprises arranging a sensor loop around a fluid conduit that is in fluid communication with a telemetry system disposed within a borehole in a subterranean formation. A light wave may be transmitted through a reference loop enclosure module to the sensor loop, the reference loop enclosure module containing a reference loop optically coupled to the sensor loop. A modified light wave may be received at a light detector optically coupled to the sensor loop. A determination may be made regarding whether a pressure pulse traveled through the fluid conduit by analyzing the modified light wave.

In certain embodiments, transmitting the light wave through the reference loop enclosure module to the sensor loop comprises transmitting the light wave through an optical splitter optically coupled to the reference loop. In certain embodiments, transmitting the light wave through the reference loop enclosure module to the sensor loop comprises transmitting the light wave from a light source optically coupled to the optical splitter through an optical connector of the reference loop enclosure; and transmitting the light wave to the sensor loop from the reference loop through a second optical connector of the reference loop enclosure. In certain embodiments, at least one of the sensor loop and the reference loop comprises a folded optical fiber with a midpoint located in a loop relief segment of the folded optical fiber.

In certain embodiments, at least one of the sensor loop and the reference loop comprises two optical fibers wound in a length-wise parallel arrangement and optically coupled together. The two fibers may be optically coupled using at least one of a loop relief segment, a reflector cube, a tapered, fiber turn, and a splice. In certain embodiments, the reference loop comprises a first optical fiber loop effectively wound in a first direction and a second optical fiber loop effectively wound in a second direction. The first optical fiber loop and the second optical fiber loop may be characterized by equal diameters and length of optical fiber.

In certain embodiments, determining if the pressure pulse traveled through the fluid conduit by analyzing the modified light wave comprises determining an intensity of the modified light wave. Analyzing the modified light wave may further comprise comparing the determined intensity of the modified light wave with an expected intensity of the modified light wave.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. An apparatus, comprising:
   an optical splitter;
   a light source optically coupled to the optical splitter;
   a light detector optically coupled to the optical splitter;
   a reference loop optically coupled to the optical splitter;
   a sensor loop optically coupled to the reference loop and the optical splitter; and
   a reference loop enclosure containing at least the reference loop, wherein the reference loop and the sensor loop each comprise two substantially equal portions effectively wrapped in opposite directions.

2. The apparatus of claim 1, further comprising a Lyot Depolariser optically coupled between the sensor loop and the optical splitter.

3. The apparatus of claim 2, wherein
   the reference loop enclosure comprises a plurality of optical connectors;
   the light source and light detector are optically coupled to the optical splitter through at least one of the plurality of optical connectors; and
   the sensor loop is optically coupled to the reference loop and the optical splitter through at least one other of the plurality of optical connectors.

4. The apparatus of claim 1, wherein at least one of the sensor loop and the reference loop comprises a folded optical fiber with a midpoint located in a loop relief segment.

5. The apparatus of claim 4, further comprising a restrain plate positioned within the loop relief segment.

6. The apparatus of claim 1, wherein at least one of the sensor loop at the reference loop comprises two fibers wound in a length-wise parallel arrangement and optically coupled together.

7. The apparatus of claim 6, wherein the two fibers are optically coupled using at least one of a loop relief segment, a reflector cube, a tapered, fiber turn, and a splice.

8. The apparatus of claim 1, wherein the first optical fiber loop and the second optical fiber loop are arranged in parallel on a reference loop core.

9. A method for telemetry pulse detection, comprising:
arranging a sensor loop around a fluid conduit that is in fluid communication with a telemetry system disposed within a borehole in a subterranean formation;
transmitting a light wave through a reference loop enclosure module to the sensor loop, the reference loop enclosure module containing a reference loop optically coupled to the sensor loop, wherein the reference loop and the sensor loop each comprise two substantially equal portions effectively wrapped in opposite directions;
receiving a modified light wave at a light detector optically coupled to the sensor loop; and
determining if a pressure pulse traveled through the fluid conduit by analyzing the modified light wave.

10. The method of claim 9, wherein transmitting the light wave through the reference loop enclosure module to the sensor loop comprises transmitting the light wave through an optical splitter optically coupled to the reference loop.

11. The method of claim 10, wherein transmitting the light wave through the reference loop enclosure module to the sensor loop comprises
transmitting the light wave from a light source optically coupled to the optical splitter through an optical connector of the reference loop enclosure; and
transmitting the light wave to the sensor loop from the reference loop through a second optical connector of the reference loop enclosure.

12. The method of claim 9, wherein at least one of the sensor loop and the reference loop comprises a folded optical fiber with a midpoint located in a loop relief segment of the folded optical fiber.

13. The method of claim 9, wherein at least one of the sensor loop and the reference loop comprises two optical fibers wound in a length-wise parallel arrangement and optically coupled together.

14. The method of claim 13, wherein the two fibers are optically coupled using at least one of a loop relief segment, a reflector cube, a tapered, fiber turn, and a splice.

15. The method of claim 9, wherein the first optical fiber loop and the second optical fiber loop are characterized by equal diameters and length of optical fiber.

16. The method of claim 9, wherein determining if the pressure pulse traveled through the fluid conduit by analyzing the modified light wave comprises determining an intensity of the modified light wave.

17. The method of claim 16, wherein analyzing the modified light wave further comprises comparing the determined intensity of the modified light wave with an expected intensity of the modified light wave.

* * * * *